United States Patent
Croft

[11] 3,773,072
[45] Nov. 20, 1973

[54] FLUID PRESSURE REGULATING VALVES
[75] Inventor: Brian Hugh Croft, Coventry, England
[73] Assignee: Brico Engineering Limited, Coventry, England
[22] Filed: Aug. 9, 1971
[21] Appl. No.: 170,039

[52] U.S. Cl. .............................................. 137/494
[51] Int. Cl. ........................................... F16k 31/36
[58] Field of Search................... 137/494, 497, 536, 137/538

[56] References Cited
UNITED STATES PATENTS
2,590,656  3/1952  Schnebel........................... 137/536
3,197,069  7/1965  Brunson........................ 137/494 X
  849,532  4/1907  Coutant........................ 137/536 X
1,363,623 12/1920  Smith.............................. 137/538 X
1,377,199  5/1921  Granby........................... 137/536 X Primary Examiner—Henry T. Klinksiek
Attorney—Holcombe, Wetherill & Brisebois

[57] ABSTRACT

This invention relates to a fluid pressure regulating valve particularly for regulating the pressure of liquid fuel fed to the injector in a fuel injection system of an internal combustion engine. In the valve fluid passes from an inlet passage to an outlet passage through an aperture and the size of the aperture is controlled by a member having an area on which the inlet fluid pressure acts in opposition to a bias means, whereby to regulate the pressure, and the member is arranged to be subject to negligible net force, in a direction which would alter the aperture size, due to variations in pressure of the outlet fluid.

2 Claims, 1 Drawing Figure

Patented Nov. 20, 1973  3,773,072
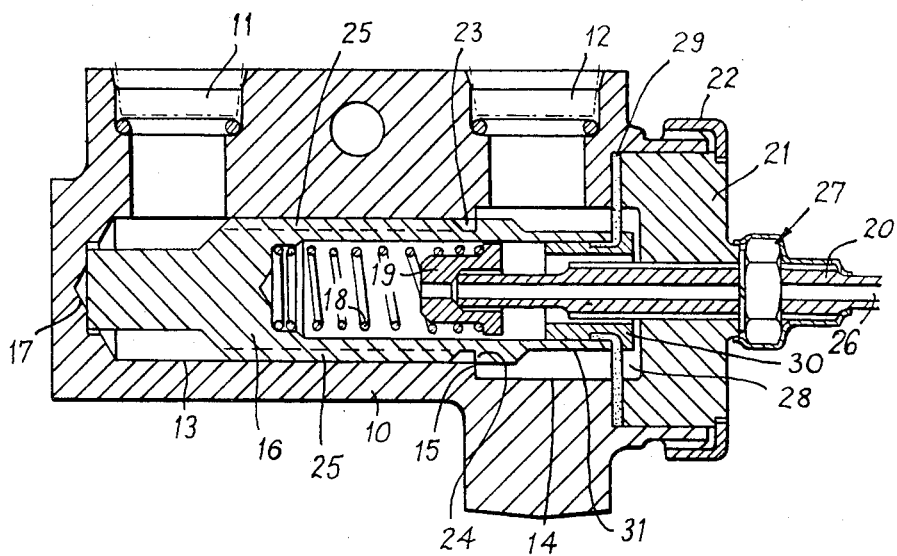

FLUID PRESSURE REGULATING VALVES

This invention relates to a fluid pressure regulating valve and is applicable particularly, but not exclusively, to a valve for regulating the pressure of liquid fuel fed to the injector in a fuel injection system of an internal combustion engine.

According to one aspect of the invention, in a fluid pressure regulating valve fluid passes from an inlet passage to an outlet passage through an aperture, the size of the aperture being controlled by a member having an area on which the inlet fluid pressure acts in opposition to a bias means, whereby to regulate the pressure, and in which the member is arranged to be subject to negligible net force, in a direction which would alter the aperture size, due to variations in pressure of the outlet fluid.

Suitably the member is arranged to have a total effective area in an opposite direction exposed to the outlet fluid pressure which area balances the total effective area of the member exposed to the outlet fluid pressure in the first-mentioned direction.

Conveniently the member includes a plunger which is movable axially towards the aperture to reduce the latter, and downstream of the aperture the plunger has a reduced effective area compared with its effective area at the aperture, whereby the outlet pressure acting on the difference in area between the reduced effective area and the aperture area will generate a force urging the plunger towards the aperture, and a diaphragm arranged to allow the axial movement of the plunger is sealed to the plunger and the valve body at the opposite side of the outlet from the aperture, the diaphragm being arranged when subject to the outlet pressure to generate a force on the plunger equal and opposite to the force urging the plunger towards the aperture. Preferably the member is axially slidable in the body.

According to another aspect of the invention a fuel injection system, for an internal combustion engine, includes any of the above-mentioned fluid pressure regulating valves, for regulating the pressure of fuel fed to the injector.

The invention is described, by way of example only, with reference to the accompanying drawing which is an axial section through one embodiment of the invention.

In the drawing a valve, for regulating the pressure of liquid fuel fed to the injector in a fuel injection system of an internal combustion engine, has a body 10 in which are formed fuel inlet and outlet passages 11, 12, respectively. The passages 11, 12 are joined by a bore 13 which terminates in a larger concentric bore 14 adjacent the outlet passage 12. The junction of the bores 13, 14 is a shoulder having a sharp corner 15.

A hollow cylindrical plunger 16 is an accurate sliding fit in the bore 13 and is urged towards the blind end 17 of the bore 13 by a low rate pre-compressed helical spring 18.

The spring 18 reacts against a thimble 19 mounted on the end of an adjusting screw 20. The latter is screwed into an end cap 21 which is held to the body 10 by a nut 22 to close the outlet end of the bores 13, 14. The plunger 16 has a circumferential groove 23 formed with a sharp corner 24 which aligns with the sharp corner 15 when the plunger 16 is in contact with the blind end 17 of the body 10. The groove 23 communicates with the inlet passage 11 by longitudinal grooves 25 formed in the plunger 16.

When pressurised fuel is admitted through the inlet passage 11 it produces an axial force on the plunger 16 which moves it to the right in the FIGURE to open an aperture between the sharp corners 15, 24. Due to the low rate of the spring 18 the pressure of inlet fuel increases this aperture until the fuel flowing therethrough has the desired regulated inlet pressure.

Fuel having passed through the regulating aperture escapes through the larger bore 14 and outlet passage 12.

The interior of the plunger 16 and the end space 28 of the bore 14 adjacent the end cap 21 is vented to atmosphere, inlet manifold pressure or other suitable standard pressure, through a bore 26 in the adjusting screw 20 which is locked by a lock nut 27. To prevent the escape of fuel through the end space 28 and bore 26, the plunger 16 is sealed to the body 10 by a rubber-like or other suitable diaphragm 29. The diaphragm 29 is held against an end face of the body 10 by the end cap 21 and is held against the right hand end face of the plunger 16 by a shouldered sleeve 30 screwed into the plunger 16.

Downstream of the regulating aperture the plunger 16 has a reduced diameter portion 31. Any back-pressure obtaining in the outlet passage 12 will act on the difference in area between the plunger 16 at the sharp shoulder 24 and at the reduced diameter portion 31 to produce force tending to urge the plunger 16 towards the left in the FIGURE. Simultaneously the outlet back-pressure acts on the diaphragm 29 to produce a force on the plunger 16 tending to move the latter to the right. By careful selection of the inner and outer diameters of that part of the diaphragm 29 exposed to the outlet back-pressure, it is possible to equate the opposing forces on the plunger 16 due to the outlet back-pressure. By this means the pressure regulating valve will adjust the pressure on its inlet passage 11 to a value which is substantially independent of any variations in the pressure of the fuel passing through the outlet passage 12.

Although the invention has been described as applied to a valve in which pressure regulation is effected by an aperture formed between sharp corners, it is applicable to any other pressure regulating valve having a different type of aperture and may be used to regulate the pressure of gases, vapours or liquids.

I claim:

1. In a fluid pressure regulating valve comprising a valve body having an inlet passage, an outlet passage, an aperture between said inlet passage and said outlet passage, a member for controlling the size of the aperture, and a bias means acting on said member to close said aperture, said member having an area on which the inlet fluid pressure acts in opposition to said bias means, the improvement according to which said member comprises a plunger which is axially slidable in a bore in the valve body, said bore communicating with the inlet passage and terminating in a larger concentric bore communicating with the outlet passage, said aperture being defined between a circumferential groove in the surface of the plunger and the corner formed by the change in diameter of the bores in the valve body, the surface of the plunger being provided with axially extending grooves which communicate with said circumferential groove and extend towards said inlet passage, and said plunger being provided with a cavity containing a helical spring forming said bias means and which reacts against an adjusting member extending through said valve body, said adjusting member serving to adjust the force exerted by the spring, and in which said plunger has a reduced effective area downstream of said aperture as compared with its effective area at the aperture whereby outlet back pressure acting on the difference in area between said reduced effective area and the effective area at said aperture will generate a force urging the plunger towards the aperture, and a diaphragm is connected to said plunger at the opposite side of said outlet passage from said aperture, said diaphragm being arranged, when subjected to said back pressure, to generate a force on the plunger equal and opposite to the force exerted on said difference in area.

2. A valve as claimed in claim 1, wherein the adjusting member contains a passage communicating with the cavity in the plunger whereby the cavity can be vented to atmosphere or another suitable standard pressure and a cap clamping the periphery of the diaphragm against the valve body, said cap having a threaded bore into which screws a threaded rod forming the adjusting member and which is provided with the passage therethrough.

* * * * *